2,763,610

ALIPHATIC CHAIN CHLORINATION OF AMINE HYDROCHLORIDES

Hans Feichtinger and Siegfried Puschhof, Duisburg-Beeck, Germany, assignors to Ruhrchemie Aktiengesellschaft, Oberhausen-Holten, Germany, a corporation of Germany No Drawing. Application November 25, 1952,
Serial No. 322,559

Claims priority, application Germany December 3, 1951

1 Claim. (Cl. 204—158)

This invention relates to improvements in aliphatic chain chlorination of amine hydrochlorides. It more particularly relates to a process for chlorinating the aliphatic carbon chain of amine hydrochlorides.

Amines or amine hydrochlorides which contain chlorine atoms in their aliphatic carbon chain are highly desirable and valuable for many synthesis purposes in organic chemistry. If, however, primary or secondary amines, and especially aliphatic alkyl amines are chlorinated in the conventional manner, the chlorine will not add on to the aliphatic carbon chain but will add at the nitrogen atom. If tertiary amines are chlorinated in the conventional manner, then the amines nitrogen will split off.

In the past attempts were made to produce amine hydrochlorides chlorinated in the aliphatic carbon chain by allowing chlorine to act in a closed vessel upon hydrochlorides of N,N-dimethyl-propylamine, n-propylamine and N,N-dimethyl-n-butylamine. (See the article by L. H. Amundsen and L. S. Pitts in the Journal of the American Chemical Society, volume 73 (1951) pp. 1494–1497.) The reaction was effected with the amine hydrochloride dissolved in chloroform while irradiating with a 200 watt bulb. The reaction could be effected in the presence of phosphorus pentoxide if desired. The reaction, however, was not completed and the chlorine charged was not completely consumed within two to three days. After the reaction had been completed, the closed reaction vessels could be opened and fresh chlorine added for the addition of additional chlorine atoms into the aliphatic chain. This process, of course, is not at all suitable for commercial operation.

One object of this invention is a process for the addition of chlorine atoms to an aliphatic chain containing more than three carbon atoms of an amine hydrochloride. This and still further objects will become apparent from the following description:

In accordance with the invention, an amine hydrochloride having an aliphatic chain with more than three carbon atoms is contacted with gaseous chlorine while being in a suspension and/or solution.

Amines which contain an aliphatic chain with more than 3 carbon atoms are converted into the corresponding amine hydrochlorides by the addition of hydrogen chloride. These amine hydrochlorides, while suspended and/or dissolved in carbon tetrachloride or aqueous hydrochloric acid, are treated with chlorine while being irradiated with ultra-violet light at room temperature or elevated temperatures. Very unexpectedly and surprisingly, a rapid substitution of the chlorine in the hydrocarbon chain with a lively splitting off of hydrogen chloride occurs.

The reaction in accordance with the invention was observed using various primary amine hydrochlorides of a series of homologues. The course of the reaction was observed by means of the quantities of chlorine taken up under constant conditions. It was very unexpectedly found that the chlorine substitution becomes increasingly faster as the length of the aliphatic carbon chain increases. Thus, in accordance with the invention, the chlorine will enter into the aliphatic chain of n-butylamine hydrochloride very rapidly while propylamine hydrochloride is very slow to react with the gaseous chlorine.

A comparison between the chlorination periods of the hydrochlorides of n-propylamine, n-butylamine, n-pentylamine, n-hexylamine and undecylamine showed very surprising results. The absorption of chlorine by the n-butylamine hydrochloride is approximately seven to eight times faster than the absorption by n-propylamine hydrochloride. In n-hexylamine hydrochloride, 1 gram atom of chlorine can be added about 60 times as fast as to n-propylamine hydrochloride. With undecylamine hydrochloride, the chlorination is about 150 times faster than with n-propylamine hydrochloride under similar reaction conditions.

This extremely rapid carbon chain chlorination of the amine hydrochlorides in accordance with the invention is of extraordinary commercial importance. The invention allows the chlorination of alkylamine hydrochlorides which are of particular importance for many purposes in a relatively short time and consequently at low cost.

The process may be carried out in batch and continuous operation. Besides adding 1 gram atom of chlorine per mol of amine hydrochloride being processed, it is also possible to introduce larger quantities of chlorine into the carbon chain.

The chlorinated amine hydrochlorides very readily and easily available in accordance with the invention, are valuable intermediate products for organic chemistry and may be further converted in various ways by means of their functional groups, i. e. their amine and/or chlorine groups.

The process in accordance with the invention is not only applicable to the chlorination of the aliphatic carbon chain of primary and secondary amine hydrochlorides, but also for tertiary amine hydrochlorides.

The following examples are given by way of illustration and not limitation:

Example 1

19.7 gms. (0.333 mole) n-propylamine were dissolved in 250 cc. carbon tetrachloride in a three-necked flask of 500 cc. capacity. While intensively cooling, dry hydrogen chloride was passed into the flask until the amine was completely neutralized. Then the reaction mixture was heated in a reflux condenser and irradiated with a mercury vapor lamp. Into the boiling mixture, gaseous chlorine was passed at a constant flow rate of 40 liters/hr. of $Cl_2$. While continuously sampling, the progressive absorption of chlorine could be observed by comparing the ionically linked chlorine with the non-ionically linked chlorine. After a treating time of 30 hours, a chlorination mixture was obtained which, after evaporation of the solvent, had taken up 1 gram atom chlorine per mol amine hydrochloride and represented a colorless, cristal powder melting at 140–150° C. The yield was 40 gms. of chlorinated n-propylamine hydrochloride.

Example 2

24.4 gms. (0.333 mole) n-butylamine were dissolved in 250 cc. carbon tetrachloride in the same manner as mentioned in Example 1 and neutralized with gaseous hydrogen chloride. By introducing a constant current of chlorine of 40 liters $Cl_2$ per hour, so much chlorine was reacted within 4 hours in the boiling mixture that, after the removal of the solvent, a substance mixture was obtained which had taken up 1 gram atom of chlorine per mole amine hydrochloride and which crystallized in white scales. It contained 45.2 gms. of chlorinated n-butylamine hydrochloride and had a melting point of 180–190° C.

Example 3

29.1 gms. (0.333 mole) n-pentylamine were dissolved in 250 cc. carbon tetrachloride in the manner as described in Example 1 and neutralized with gaseous hydrogen chloride. Then the n-pentylamine hydrochloride mixture was heated in a reflux condenser until it boiled. While irradiating the boiling mixture with a mercury vapor lamp, gaseous chlorine was passed in at a constant flow rate of 40 liters/hr. of $Cl_2$. It was found by continuously observing the absorption of chlorine, that as early as 60 minutes after the beginning of the introduction of chlorine a reaction mixture was present which had taken up 1 gram atom of chlorine per mol amine hydrochloride. By filtration in vacuo, 50.1 gms. of chlorinated n-pentylamine hydrochloride could be recovered which represented a colorless crystalline substance having a melting point of 170–180° C.

Example 4

33.7 gms. (0.333 mole) n-hexylamine were treated in a manner analogous to that of the preceding examples. After neutralization with dry hydrogen chloride, chlorine was passed in. Within 31 minutes, a chlorination mixture was obtained which had taken up 1 gram atom of chlorine per mole amine hydrochloride. The yield was 53 gms. of chlorinated n-hexylamine hydrochloride in the crystallized form having a melting point of 140–150° C.

Example 5

33.7 gms. (0.333 mole) n-hexylamine were dissolved in 100 cc. concentrated hydrochloric acid and treated with gaseous chlorine in the manner as described in Example 1 until 1 gram atom chlorine was taken up per mol amine hydrochloride. The chlorination time required was 40 minutes. After evaporation of the hydrochloric acid which was effected under vacuum, 55.2 gms. of chlorinated n-hexylamine hydrochloride in crystallized form could be recovered. The melting point of the material was 135–145° C.

Example 6

57.0 gms. (0.333 mole) undecylamine were neutralized with hydrogen chloride in the manner as described in Example 1. 40 liters $Cl_2$ were hourly passed into the boiling mixture while irradiating the same. Within 12 minutes, the undecylamine hydrochloride took up 1 gram atom chlorine per mol amine hydrochloride. 76.2 gms. of chlorinated undecylamine hydrochloride in the form of an oily substance could be recovered from the reaction solution.

Example 7

43.1 gms. (0.333 mole) di-n-butylamine were dissolved in 250 cc. carbon tetrachloride and neutralized with gaseous hydrogen chloride thereby separating the amine hydrochloride in the form of a fine crystal powder. The mixture was heated in the reflux condenser in the manner described in Example 1 and gaseous chlorine was introduced while irradiating with a mercury vapor lamp until 1 gram atom chlorine per mole amine hydrochloride was taken up. By simple suction, the chlorinated di-n-butylamine hydrochloride could be obtained in substance. A total of 22 minutes were required for the chlorination. The yield was 63 gms. of chlorinated di-n-butylamine hydrochloride having a melting point of 260–270° C.

Example 8

43.1 gms. (0.333 mole) di-n-butylamine were dissolved in 250 cc. carbon tetrachloride. The mixture was treated with gaseous chlorine in the manner described in Example 7 until approximately 2 gram atoms chlorine per mole amine hydrochloride were taken up which required a chlorination time of 3 hours. As end product, 75.1 gms. of chlorinated di-n-butylamine hydrochloride were obtained in the form of a colorless crystalline compound which had a melting point of 250–260° C. and was separated by filtration in vacuo.

Example 9

45.8 gms. (0.333 mole) n-hexylamine hydrochloride were dissolved in 100 cc. water and treated at 40° C. with gaseous chlorine until 1 gram atom chlorine was taken up per mole amine hydrochloride. The solution was evaporated under vacuum and yielded 56 gms. of chlorinated n-hexylamine hydrochloride in white scales.

We claim:

A process for the chlorination of a saturated aliphatic carbon chain of an amine hydrochloride, which comprises contacting a boiling liquid carbon tetrachloride solution of an amine hydrochloride selected from the group consisting of primary and secondary amine hydrochlorides having a saturated aliphatic chain containing more than 3 carbon atoms with gaseous chlorine at about normal pressure, irradiating said amine hydrochloride with ultraviolet light during said contacting, and recovering the amine hydrochloride chlorinated in the carbon chain formed.

References Cited in the file of this patent

UNITED STATES PATENTS

| | | |
|---|---|---|
| 2,337,912 | McBee et al. | Dec. 28, 1943 |
| 2,390,470 | Sumner | Dec. 4, 1945 |

OTHER REFERENCES

Amundsen et al.: Journal American Chemical Society, vol. 73 (1951), pages 1494–1497.